(12) United States Patent
Henning et al.

(10) Patent No.: US 8,796,198 B2
(45) Date of Patent: Aug. 5, 2014

(54) PROCESS FOR PRODUCING POLYSILOXANES WITH NITROGEN-CONTAINING GROUPS

(75) Inventors: Frauke Henning, Essen (DE); Andrea Lohse, Bottrop (DE); Ulrike Mahring, Essen (DE); Dirk Kuppert, Aschaffenburg (DE)

(73) Assignee: Evonik Degussa GmbH, Essen (DE)

( * ) Notice: Subject to any disclaimer, the term of this patent is extended or adjusted under 35 U.S.C. 154(b) by 9 days.

(21) Appl. No.: 13/584,331

(22) Filed: Aug. 13, 2012

(65) Prior Publication Data

US 2013/0040875 A1 Feb. 14, 2013

(30) Foreign Application Priority Data

Aug. 12, 2011 (DE) .................. 10 2011 110 100

(51) Int. Cl.
*C11D 9/36* (2006.01)
(52) U.S. Cl.
USPC .......... 510/466; 510/122; 510/276; 510/343; 510/347; 510/417
(58) Field of Classification Search
USPC ................. 510/122, 276, 343, 347, 417, 466
See application file for complete search history.

(56) References Cited

U.S. PATENT DOCUMENTS

| | | | |
|---|---|---|---|
| 4,426,299 A | 1/1984 | Verbruggen | |
| 4,523,002 A | 6/1985 | Campbell et al. | |
| 4,806,255 A | 2/1989 | Konig et al. | |
| 4,855,072 A | 8/1989 | Trinh et al. | |
| 5,914,382 A | 6/1999 | Friebe et al. | |
| 6,171,515 B1 | 1/2001 | Evans et al. | |
| 6,254,811 B1 | 7/2001 | Finger et al. | |
| 6,284,860 B1 | 9/2001 | Sommer et al. | |
| 6,540,791 B1* | 4/2003 | Dias | 8/111 |
| 7,151,150 B2 | 12/2006 | Scheim et al. | |
| 7,238,768 B2 | 7/2007 | Hupfield et al. | |
| 7,361,777 B2 | 4/2008 | Herrwerth et al. | |
| 7,619,035 B2 | 11/2009 | Henning et al. | |
| 8,076,440 B2 | 12/2011 | Kuppert et al. | |
| 8,084,633 B2 | 12/2011 | Herrwerth et al. | |
| 8,138,294 B2 | 3/2012 | Henning et al. | |
| 8,304,569 B2 | 11/2012 | Cremer | |
| 2002/0137651 A1* | 9/2002 | Altmann et al. | 510/276 |
| 2004/0220331 A1* | 11/2004 | Sixt et al. | 524/860 |
| 2008/0125503 A1 | 5/2008 | Henning et al. | |
| 2008/0251751 A1 | 10/2008 | Bruckner et al. | |
| 2009/0007483 A1 | 1/2009 | Hansel et al. | |
| 2009/0124753 A1* | 5/2009 | Prasse | 524/588 |
| 2009/0131585 A1* | 5/2009 | Prasse | 524/861 |
| 2010/0022435 A1 | 1/2010 | Henning et al. | |
| 2010/0029587 A1 | 2/2010 | Brueckner et al. | |
| 2010/0081763 A1 | 4/2010 | Meyer et al. | |
| 2010/0105843 A1 | 4/2010 | Knott et al. | |
| 2010/0113633 A1 | 5/2010 | Henning et al. | |
| 2010/0184634 A1 | 7/2010 | Henault et al. | |
| 2010/0184913 A1 | 7/2010 | Ebbrecht et al. | |
| 2010/0249339 A1 | 9/2010 | Henning et al. | |
| 2010/0266651 A1 | 10/2010 | Czech et al. | |
| 2010/0298455 A1 | 11/2010 | Henning et al. | |
| 2011/0021693 A1 | 1/2011 | Henning et al. | |
| 2011/0028647 A1* | 2/2011 | Sixt et al. | 524/858 |
| 2011/0034576 A1 | 2/2011 | Henning et al. | |
| 2011/0035886 A1* | 2/2011 | Zhang et al. | 8/409 |
| 2011/0091399 A1 | 4/2011 | Meyer et al. | |
| 2011/0172373 A1 | 7/2011 | Knott et al. | |
| 2011/0230619 A1 | 9/2011 | Kuppert et al. | |
| 2011/0245412 A1 | 10/2011 | Schubert et al. | |
| 2011/0306694 A1 | 12/2011 | Glos et al. | |
| 2012/0027704 A1 | 2/2012 | Henning et al. | |
| 2012/0097883 A1 | 4/2012 | Henning et al. | |

FOREIGN PATENT DOCUMENTS

| | | |
|---|---|---|
| DE | 19733168 A1 | 2/1999 |
| DE | 19751151 A1 | 5/1999 |
| DE | 102008000140 A1 | 7/2009 |
| DE | 102009048978 A1 | 4/2011 |
| EP | 0399706 B1 | 11/1990 |
| EP | 0763556 A1 | 3/1997 |
| EP | 1006146 A1 | 6/2000 |
| EP | 1431330 A1 | 6/2004 |
| GB | 239910 | 9/1925 |
| GB | 1596792 | 8/1981 |
| WO | 9201776 A1 | 2/1992 |
| WO | 9524460 A1 | 9/1995 |
| WO | 9731997 A1 | 9/1997 |
| WO | 9731998 A1 | 9/1997 |
| WO | 9819665 A1 | 5/1998 |
| WO | 2007115872 A1 | 10/2007 |
| WO | 2007125005 A1 | 11/2007 |

OTHER PUBLICATIONS

European Search Report dated Nov. 5, 2012 received in a corresponding foreign application.
Guoyong, W., et al., "Carbohydrate-modified siloxane surfactants and their adsorption and aggregation behavior in aqueous solution" The Journal of Physical Chemistry B, May 2010; 114(20), pp. 6872-6877.

* cited by examiner

*Primary Examiner* — Charles Boyer
(74) *Attorney, Agent, or Firm* — Scully, Scott, Murphy & Presser, P.C.

(57) ABSTRACT

A process for producing amino-functional polysiloxanes by reacting the components A) identical or different terminally hydroxy-functional, linear or branched polysiloxanes, B) identical or different alkoxysilanes of the formula $$R^1_x R^2_{3-x} SiR^3 \qquad (I)$$

where $R^1$ is identical or different alkyl radicals having 1 to 4 carbon atoms, $R^2$ is identical or different alkoxy radicals having 1 to 4 carbon atoms, $R^3$ is an organic radical having at least one nitrogen atom, $x=0$ to 2, and C) water, in the presence of D) one or more phosphorus-containing, Brønsted-acidic compounds, to the correspondingly obtainable polysiloxanes containing nitrogen-containing groups, and to the use thereof are provided.

14 Claims, No Drawings

PROCESS FOR PRODUCING POLYSILOXANES WITH NITROGEN-CONTAINING GROUPS

FIELD OF THE INVENTION

The present invention is directed to a process for producing polysiloxanes containing at least one nitrogen-containing group, in particular amino-functional polysiloxanes, by reacting the components A) identical or different terminally hydroxy-functional, linear or branched polysiloxanes, B) identical or different alkoxysilanes of the formula $$R^1_x R^2_{3-x} SiR^3 \qquad (I)$$

where $R^1$ is identical or different alkyl radicals having 1 to 4 carbon atoms, $R^2$ is identical or different alkoxy radicals having 1 to 4 carbon atoms, $R^3$ is an organic radical having at least one nitrogen atom, x=0 to 2, and C) water, in the presence of D) one or more phosphorus-containing, Brønsted-acidic compounds. The present invention also relates to the polysiloxanes containing nitrogen-containing groups that are prepared by the process, and to the use thereof.

BACKGROUND OF THE INVENTION

Amino-functional siloxanes are used widely as constituents of textile-care compositions, in particular of textile-softening compositions, as constituents of detergents or cleaners for textiles and hydrophobicizing compositions. A large number of structural variations of this substance group is described in the prior art and is accessible via various production routes.

Polysiloxanes with high degrees of modification coupled with a chain length which can be variably adjusted irrespective of the nitrogen content are accessible by means of lateral functionalization of a polysiloxane with organic substituents containing amino groups. To achieve optimum application properties, it is advantageous to be able to adjust the nitrogen content of an amino-functional polysiloxane and the molar mass independently of one another.

The prior art discloses a large number of documents relating to laterally modified aminosiloxanes. The basically catalyzed equilibration for the production, as explained, for example, in EP 1 972 330 in paragraphs [0154] and [0155], can lead, depending on the starting materials used, either to terminally dihydroxy-functional, laterally amino-modified polysiloxanes, or to laterally amino-modified polysiloxanes, the end chains of which are end-capped with trimethylsilyl groups. Compared to their structural analogues provided with free SiOH groups, such end-capped polysiloxanes have not only better storage stability without dilution, but also prevent gel-like precipitations and growths when handling aqueous emulsions of such polysiloxanes. These gel deposits are particularly undesired for applications in the textile sector.

According to the prior art, as is described for example in U.S. Pat. No. 7,238,768 B2, the condensation polymerization leads to amino-modified polysiloxanes with hydroxyl groups or alkoxy groups at the chain ends. The catalysts used are carboxylic acids. The unpublished patent application DE 102010042861.2 describes a carboxylic-acid-catalyzed condensation polymerization which makes accessible hydrolysis-stable polysiloxanes with trimethylsiloxy groups at the chain ends and different lateral modifications in defined ratios.

U.S. Pat. No. 6,171,515 B1 describes end-capped and dialkoxy-functional aminopolysiloxanes which, in a synthesis step downstream of the siloxane polymerization, undergo a functionalization of the primary and secondary amino groups with epoxy-functional monomers, such as, for example, glycidol. A similar functionalization of aminosiloxanes with alkylene oxides is described in EP0399706. Further functionalizations of amino-functional polysiloxanes with glycerol carbonate or gluconolactone are described in EP 1 972 330 and in J. Phys. Chem. B 2010, 114, 6872-6877.

Amino-functional polysiloxanes are being continually improved in order to impart advantageous effects to the textile sheet materials treated therewith, such as, for example, a textile-softening effect, crease resistance and/or to reduce the harmful or negative effects which can arise during cleaning and/or conditioning and/or wearing, such as, for example, fading, greying, etc. Moreover, as well as a good soft feel of the fabric, a further aim is to achieve an adequate hydrophilicity. One disadvantage of textile-softening formulations based on polysiloxanes of the prior art consists in the oxidation sensitivity of the nitrogen-carrying groups. Both the amino-functional polysiloxanes and also the formulations thereof have an increasing yellow coloration depending on the storage conditions. Furthermore, the viscosity of the polysiloxane can increase to the point of gelation during storage. Unfavourable processing conditions during production, such as, for example, thermal stress, can adversely affect the storage stability of the amino-functional siloxane or formulations thereof or even lead to gelation during the synthesis.

The prior art, as illustrated by way of example in WO 1998019665 or DE 102009048978, describes the use of reducing agents such as, for example, sulphites, for stabilizing amine-containing formulations. In order to minimize the oxidation potential, the alkaline pH values of the amine-containing formulations are shifted to the neutral to weakly acidic range by adding mild soluble acids.

In view of the disadvantages of the prior art, there is a need for textile-softening polysiloxanes with increased storage stability. There is also a need for a production process which makes accessible comparatively low-viscosity, storage-stable amino-functional polysiloxanes.

SUMMARY OF THE INVENTION

The object of the present invention was therefore to provide a simple process for producing polysiloxanes having nitrogen-containing groups which avoids one or more of the disadvantages of the prior art processes.

Surprisingly, it has been found that this object can be achieved by the process according to the invention described below for producing polysiloxanes containing at least one nitrogen-containing group, in which hydroxy-functional, linear or branched polysiloxanes, alkoxysilanes which have at least one organic radical having a nitrogen atom, and water are reacted in the presence of one or more phosphorus-containing, Brønsted-acidic compounds.

The present invention therefore provides a process for producing polysiloxanes containing at least one nitrogen-containing group, in particular amino-functional polysiloxanes, by reacting the components A) identical or different terminally hydroxy-functional, linear or branched polysiloxanes, B) identical or different alkoxysilanes of the formula $$R^1_x R^2_{3-x} SiR^3 \qquad (I)$$

where $R^1$ is identical or different alkyl radicals having 1 to 4 carbon atoms, $R^2$ is identical or different alkoxy radicals having 1 to 4 carbon atoms, $R^3$ is an organic radical having at least one nitrogen atom, x=0 to 2, and C) water, in the presence of D) one or more phosphorus-containing, Brønsted-acidic compounds.

The present invention likewise provides the correspondingly obtainable polysiloxanes comprising nitrogen-containing groups, and also the use thereof.

The phosphorus-containing, Brønsted-acidic compounds used in the production of the inventive polysiloxanes having nitrogen-containing groups, which are used in particular as condensation polymerization catalysts, can remain after the production in the composition comprising the polysiloxanes having nitrogen-containing groups produced according to the invention. This has the advantage that a complex separation step can be dispensed with. A further advantage is that the phosphorus-containing, Brønsted-acidic compounds which remain in the reaction mixture have a positive influence on the storage stability of corresponding compositions. This is unexpected and unforeseeable by the person skilled in the art since the active catalyst generally has to be removed in order to ensure the storage stability of the product. For example, when using tetraalkylammonium catalysts, it is imperative to destroy the catalyst after the reaction by heating, as is described, by way of example, in EP 1 972 330 in paragraph [0154].

A further advantage compared with the carboxylic-acid-catalyzed condensation processes in the prior art, for example in U.S. Pat. No. 7,238,768 B2, consists in the comparatively lower yellowing tendency during the reaction. Particularly at elevated temperature and inadequate inertization, the reactants and products having nitrogen-containing groups have a tendency towards yellowing. In the presence of carboxylic acids, at elevated temperatures, there is also the risk of secondary reactions, for example as a result of amidation reactions. In order to achieve high degrees of condensation, however, higher temperatures are advantageous. With the help of the process according to the invention, secondary reactions, even at relatively high reaction temperatures of ca. 100° C., are avoided and therefore better condensation yields are achieved in a shorter time.

DETAILED DESCRIPTION OF THE INVENTION

The process according to the invention, the polysiloxanes obtainable in this way, and also the use thereof are described by way of example below without intending to limit the invention to these exemplary embodiments. Where ranges, general formulae or compound classes are given below, then these are intended to encompass not only the corresponding ranges or groups of compounds that are explicitly mentioned, but also all part ranges and part groups of compounds which can be obtained by extracting individual values (ranges) or compounds. Where documents are cited within the context of the present description, then their contents are deemed as belonging, in their entirety, to the disclosure of the present invention. Where percentages are given below, then, unless stated otherwise, these are percentages by weight. For compositions, the percentages, unless stated otherwise, are based on the total composition. Where average values are given below, then, unless stated otherwise, these are number averages. Where measurement values are given below, then these measurement values, unless stated otherwise, have been ascertained at a pressure of 101 325 Pa and a temperature of 23° C.

The process according to the invention for producing amino-functional polysiloxanes is characterized by the reaction of the components A) identical or different terminally hydroxy-functional, linear or branched polysiloxanes,
B) identical or different alkoxysilanes of the formula (I)

$$R^1_x R^2_{3-x} SiR^3 \quad (I)$$

where
$R^1$ is identical or different alkyl radicals having 1 to 4 carbon atoms, preferably methyl or ethyl radicals, preferably methyl radicals,
$R^2$ is identical or different, preferably identical, alkoxy radicals having 1 to 4 carbon atoms, preferably methoxy or ethoxy radicals,
$R^3$ is an organic radical having at least one nitrogen atom, preferably a radical $-(CR^4_2)_y-[NR^5-(CR^4_2)_z]_e NR^5_2$ where y=1 to 6, preferably 1 to 4, preferably 3, z=1 to 6, preferably 1 to 4, preferably 2 or 3, e=0 to 6, preferably 0 to 3, preferably 0 or 1, $R^4$ is identical or different alkyl, preferably having 1 to 10 carbon atoms, or H, preferably H and $R^5$ is identical or different alkyl, preferably having 1 to 10 carbon atoms, H, linear or branched hydroxyalkyl, preferably having 1 to 20 carbon atoms, linear or branched polyhydroxyalkyl, preferably having 1 to 20 carbon atoms, linear or branched acyl or hydroxyacyl, preferably having 1 to 20 carbon atoms, in particular $-C(O)-[CH(OH)]_4-CH_2OH$, linear or branched carboxyacyl, preferably having 1 to 20 carbon atoms, in particular $-C(O)-CH_2-CH_2-COOH$, linear or branched carbamatoalkyl, preferably having 1 to 20 carbon atoms and 1-20 oxygen atoms, in particular $-C(O)-O-CH_2-CH(OH)-CH_2OH$, $-C(O)-NH_2$ (ureido), ureidoalkyl preferably having 1 to 20 carbon atoms, a radical $-C(NH)-NH_2$ which, bonded to a nitrogen atom, leads to a guanidine radical, an alkylamino(alkylimino)alkylene radical of the formula $-C(NR^6)-NR^6_2$ where $R^6$ is preferably alkyl having 1 to 20 carbon atoms; $R^3$ is preferably a radical $-(CH_2)_{y'}-NR^{4'}R^{5'}$ where y'=1 to 10, preferably 2 to 5, preferably 3, $R^{4'}$ and $R^{5'}$ are identical or different H or $-(CH_2)_{z'}-NH_2$ where z'=1 to 10, preferably 2 to 5, preferably 2, where at least one of the radicals $R^4$ or $R^5$ is preferably H,
x=0 to 2, preferably 0 or 1, and
C) water,
in the presence of D) one or more phosphorus-containing, Brønsted-acidic compounds.

The amount of component D) used is preferably from 0.1 to 30 mol %, preferably 1 to 20 mol % and particularly preferably from 5 to 15 mol %, based on the amount of alkoxysilanes used (component B).

The fraction of water, based on the total amount of components A) to D) is preferably from 0.001 to 1% by weight, preferably from 0.01 to 0.5% by weight.

Preferably, in the process according to the invention, components A) and B) are used in amounts such that the molar ratio of OH groups in component A) to radicals $R^2$ in component B) is 1:1 or >1:1, particularly preferably from >1 to 2:1.

As component A), hydroxy-functional polysiloxanes of the formula (III)

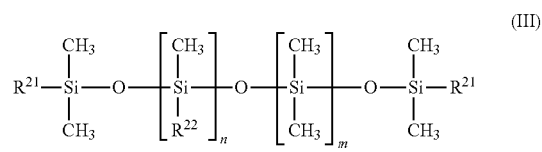

are preferably used, where
n=0 to 10, preferably 0,
m=1 to 500, preferably 10 to 200, in particular 15 to 100,
$R^{21}$ is identical or different OH or $CH_3$, preferably identical OH, where at least one radical
$R^{21}$=OH, $R^{22}$ is identical or different OH or identical or nonidentical radicals from the group comprising linear, cyclic or branched, aliphatic or aromatic, saturated or unsaturated hydrocarbon radicals having from 2 to 20 carbon atoms —CH$_2$—R$^{IV}$,
—CH$_2$—CH$_2$—(O)$_x$'—R$^{IV}$,
—CH$_2$—CH$_2$—CH$_2$—O—CH$_2$—CH(OH)—CH$_2$OH,

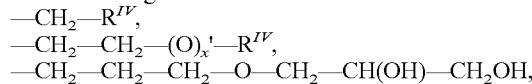

and

—CH$_2$—CH$_2$—CH$_2$—O—CH$_2$—C(CH$_2$OH)$_2$—CH$_2$—CH$_3$,
where
x' is 0 or 1 and
R$^{IV}$ is an optionally substituted, optionally halogen-substituted hydrocarbon radical having 1 to 50 carbon atoms,
where $R^{22}$ is preferably OH.

It may be advantageous if component A) is present in a mixture with a component A1). Preferred compounds of component A1) are alkylalkoxysilanes, preferably dimethyldialkoxysilanes or methyltrialkoxysilanes, where alkoxy preferably has the meaning methoxy or ethoxy. Preferably, the components A) and A1) are used in a molar ratio of from 10:1 to 1000:1, in particular 100:1 to 1000:1.

As component B), preferably N-(aminoethyl)aminopropylmethyldimethoxysilane, which is available under the name Dynasylan® 1411 from Evonik Industries AG, or aminopropylmethyldiethoxysilane, which is available under the name Dynasylan® 1505 from Evonik Industries AG, are used.

As component D) in the process according to the invention, preference is given to using a compound of the empirical formula (II)

$$H_a R^{11}{}_b P_c O_d \qquad (II)$$

where
$R^{11}$=identical or different, preferably identical, mono- or polyvalent hydrocarbon radicals optionally having phosphorus, oxygen and/or nitrogen atom(s),
a=(c+2) or <(c+2), preferably 2,
b=(c+2) or <(c+2), preferably 1,
c=1 to 10, preferably 1 to 5, in particular 1,
d=(3c+1) or <(3c+1), preferably 3,
with the proviso that a+b=c+2 and a>0, preferably greater than or equal to 1.

As component D) in the process according to the invention, preference is given to using monomeric or oligomeric phosphoric acids, monomeric or oligomeric phosphonic or phosphinic acids, hypodiphosphonic or hypodiphosphinic acids, or hydrocarbon-radical-substituted organic derivatives of one of the aforementioned acids, or mixtures thereof. It is also possible to use those acids which can be referred to as bridged diphosphonic acids, such as, for example, 1-hydroxyethane (1,1-diphosphonic acid), aminotrimethylenephosphonic acid, diethylenetriaminepenta(methylenephosphonic acid), ethylenediaminetetra(methylene-phosphonic acid) or 2-phosphonobutane-1,2,4-tricarboxylic acid. Particular preference is given to the use of phosphoric acid and alkylphosphonic acids, in particular octylphosphonic acid, as component D). Component D) can be present as a solid at room temperature or reaction temperature. In such a case, it is advantageous to dissolve it in a small amount of solvent, preferably 0.3 g to 2 g of solvent per 1 g of component D), and then to add the solution to the reaction mixture. Suitable solvents are, e.g., monools, preferably methanol, ethanol, n-propanol or isopropanol, preferably ethanol. Particular preference is given to the use of an ethanolic solution of octylphosphonic acid. Preferably, a highly concentrated solution is used with a content of component D), in particular phosphonic acid, of 50% by weight.

The process according to the invention includes a formation of the catalytically active phosphorus-containing, Brønsted-acidic compounds (component D) from inactive precursors in situ before or during the reaction. Inactive precursors mentioned by way of example are phosphoric or phosphonic acid esters which, as a result of hydrolysis, bring about the catalytically active compound, or else salts from which, in the presence of a suitable auxiliary acid, the phosphorus-containing, Brønsted-acidic compounds are formed.

In one embodiment of the present disclosure, it may be advantageous if, in addition to component D), a further catalytically active component D1) is used. Preferred components D1) can be, e.g., carboxylic acids, such as, e.g., acetic acid, propionic acid, oleic acid or isononanoic acid, but also mineral acids, such as, e.g., HCl, H$_3$PO$_4$, H$_2$SO$_4$, optionally with the addition of water, where component D) is preferably not a carboxylic acid. Component D1) is particularly preferably an auxiliary acid.

In some embodiments of the present disclosure, it may be advantageous if, as further component E), a disilazane, preferably 1,1,1,3,3,3-hexamethyldisilazane or disilazane substituted with different carbon radicals, such as, for example, divinyltetramethyldisilazane, or a compound equipped with a group that is reactive with an Si—OH group, preferably a monool, preferably a monool which has 1 to 30, preferably 4 to 22 and particularly preferably 8 to 18 carbon atoms, particularly preferably a fatty alcohol, preferably selected from stearyl alcohol and lauryl alcohol, is used. As further component E), preference is given to using 1,1,1,3,3,3-hexamethyldisilazane. The fraction of component E) is preferably 0.01 to 0.5 mol, in particular 0.03 to 0.3 mol, based on 1 mol of component A).

The process of the present disclosure can be carried out continuously or discontinuously. Preferably, the process of the present disclosure is carried out discontinuously (batch procedure).

The process of the present disclosure is preferably carried out at temperatures from 0° C. to 150° C., preferably from 20° C. to 100° C.

The overall process according to the invention can be carried out at superatmospheric pressure, standard pressure or reduced pressure. Preferably, the process is carried out at a pressure from 1 to 2000 mbar, preferably 2 to 1013 mbar.

In some embodiments of the present disclosure, it may be advantageous to carry out the process according to the invention in different processing steps:

Step A:

Combining and intimate mixing of component A) with some or all of component D) and optionally C). The mixing can take place with any stirrer in the batch procedure or with static mixers in a continuous procedure. In step A, the mixture is preferably heated to a temperature of 50 to 100° C., preferably 75 to 90° C. If, in the process according to the invention, the component E) is also used, then the addition of this component likewise takes place in step A. Any ammonia formed during the reaction of components A) and E) is preferably removed before process step B by degassing.

Step B:

Addition of component B) and, if not carried out, or not completely carried out, in step A, component D) and/or C) and subsequent application of a subatmospheric pressure, preferably from 1 mbar to 500 mbar, during which alcohol that is liberated is preferably distilled off. Step B is preferably carried out at a temperature from 75 to 125° C., preferably 80 to 110° C.

Step C:

Aeration of the reaction mixture to standard pressure using a gas, preferably using air or an inert gas, preferably with nitrogen, and cooling of the reaction mixture to ambient temperature and optionally working up the reaction mixture. Such a work-up can consist, e.g., in filtering the reaction mixture to separate off any solids fractions produced, or else also deodorizing it.

By gassing with a gas, preferably with an inert gas, more preferably with nitrogen, both the mixing in step A and also the distillation in step B can be supported. The gassing can take place by means of the use of a bubble-column reactor or the use of a gas-ring line in the reactor.

In the process according to the invention, a different order of the reaction is also possible. Thus, e.g., component D) can be first mixed with B) and optionally C) and reacted at 70 to 125° C., in which case the reaction is preferably carried out at a subatmospheric pressure of 1 mbar to 500 mbar (absolute), and during which alcohol that is liberated is preferably distilled off. Component A) is then added to the reaction mixture thus obtained.

By means of the process according to the invention, polysiloxanes comprising nitrogen-containing groups and also compositions which have a polysiloxane comprising nitrogen-containing groups are obtainable. As a rule, the products obtained by the process according to the invention (polysiloxanes comprising nitrogen-containing groups and/or compositions which have a polysiloxane comprising nitrogen-containing groups) are transparent and colorless and odorless, which constitutes one advantage of the process according to the invention.

The polysiloxanes comprising nitrogen-containing groups can be further derivatized by processes known to the person skilled in the art. Possible derivatization processes are described, e.g., in U.S. Pat. No. 6,171,515, EP 0399706 or EP 1972330.

Polysiloxanes comprising nitrogen-containing groups according to the invention are characterized in that they have been produced by the process according to the invention.

Compositions according to the invention are characterized in that they have at least one polysiloxane comprising nitrogen-containing groups and also one or more phosphorus-containing, Brønsted-acidic compounds, preferably one as defined above, and can preferably be obtained by the process according to the invention.

The weight-percentage ratio of polysiloxanes comprising nitrogen-containing groups to phosphorus-containing, Brønsted-acidic compounds is from 90.00% by weight to 99.99% by weight, preferably from 95.00% by weight to 99.90% by weight and particularly preferably from 97.00% by weight to 99.70% by weight, of the polysiloxane carrying nitrogen-containing groups. The weight-percentage fraction of the phosphorus-containing, Brønsted-acidic compounds is accordingly from 10.00% by weight to 0.01% by weight, preferably from 5.00% by weight to 0.10% by weight and particularly preferably from 3.00% by weight to 0.30% by weight.

Polysiloxanes comprising a nitrogen-containing group according to the invention or compositions according to the invention can be used as textile-care compositions, as detergents or cleaners for textiles or as hydrophobicizing compositions or for producing these or as a constituent of these.

Within the context of the present application, a textile-care composition is understood as meaning any composition which imparts an advantageous effect to textile sheet materials treated therewith, such as, for example, a textile-softening effect, crease resistance and/or reduces the harmful or negative effects which can arise during cleaning and/or conditioning and/or wearing, such as, for example, fading, greying, etc. The textile-care composition is preferably a textile-softening composition (fabric softener). It is known that fabric softener compositions can comprise one or more silicones or organically modified siloxanes which reduce, e.g., the creasing of fabric after the rinse cycle and after drying, make ironing easier, bring about an increased softness or bring about improved rewettability. This is disclosed, for example in WO 9524460, GB 1596792, U.S. Pat. No. 4,426,299, U.S. Pat. No. 4,806,255, GB 0239910 and U.S. Pat. No. 4,855,072.

The use of microemulsions for introducing silicones into fabric softener formulations is described for example in WO 92/01776. The use of macroemulsions for introducing silicones into fabric softener formulations is described e.g. in WO A 97/31997 and WO A 97/31998.

The compositions according to the invention can be micro- or macroemulsions.

The compositions according to the invention, in particular textile-softening compositions (fabric softeners), have from 5 to 98% by weight, preferably from 75 to 90% by weight, of water, based on the total composition.

If the compositions according to the invention are textile-softening compositions (fabric softeners), then these can comprise one or more cationic textile-softening compounds which have one or more long-chain alkyl groups in a molecule, such as, for example, methyl-N-(2-hydroxyethyl)-N, N-di(tallow-acyloxyethyl)ammonium compounds or N,N-dimethyl-N,N-di(tallow-acyloxyethyl)ammonium compounds. Further suitable ammonium compounds are disclosed in U.S. Patent Application Publication No. 2010/0184634 in paragraphs [0027] to [0068], the explicit disclosure of which in this regard forms part of this disclosure by virtue of this reference.

The fabric softeners can comprise further additives and auxiliaries, in particular perfume, dyes, viscosity regulators, antifoams, preservatives, organic solvents, non-siloxane-containing polymers and/or other siloxane-containing polymers not produced according to the invention. In particular, the compositions according to the invention can comprise in total from 0.001 to 25% by weight, particularly preferably 0.01 to 15% by weight, of one or more different additives or auxiliaries.

As a perfume, all fragrances or fragrance mixtures known to be suitable for fabric softeners from the prior art can be used, preferably in the form of a perfume oil. Examples of fragrances are disclosed inter alia in DE 197 51 151 A1, page 4, lines 11-17. In particular, the compositions according to the invention can comprise from 0.01 to 10% by weight, preferably 0.1 to 5% by weight, based on the total composition of the composition, of one or more perfumes.

As dyes, all dyes known to be suitable for fabric softeners from the prior art can be used, with preference being given to water-soluble dyes. Examples of suitable water-soluble standard commercial dyes are SANDOLAN® Walkblau NBL 150 (manufacturer Clariant) and Sicovit® Azorubine 85 E122 (manufacturer BASF). In particular, the compositions according to the invention can comprise from 0.001 to 0.1% by weight, preferably from 0.002 to 0.05% by weight, of one or more dyes.

As a viscosity regulator for reducing the viscosity, the fabric softener can comprise an alkali metal or alkaline earth metal salt, or mixtures thereof, preferably calcium chloride, preferably in an amount of from 0.05 to 2% by weight, based on the total composition of the composition.

As a viscosity regulator for increasing the viscosity, the aqueous fabric softener can comprise a thickener known to be suitable from the prior art, with preference given to the polyurethane thickeners known from WO 2007/125005. Examples of suitable thickeners are TEGO® Visco Plus 3030 (manufacturer Evonik Tego Chemie), Acusol® 880 and 882 (manufacturer Rohm & Haas), Rheovis® CDE (manufacturer BASF), Rohagit® KF 720 F (manufacturer Evonik Röhm GmbH) and Polygel® K100 from Neochem GmbH.

As an antifoam, all antifoams known to be suitable for fabric softeners from the prior art can be used. Examples of suitable standard commercial antifoams are Dow Corning® DB-110A and TEGO® Antifoam® 7001 XP. In particular, the compositions according to the invention can comprise from 0.0001 to 0.05% by weight, preferably from 0.001 to 0.01% by weight, of one or more different antifoams.

As a preservative, the fabric softener can comprise bactericidal and/or fungicidal active ingredients known to be suitable from the prior art, with preference given to water-soluble active ingredients. Examples of suitable standard commercial bactericides are methylparaben, 2-bromo-2-nitro-1,3-propanediol, 2-methyl-4-isothiazolin-3-one and 5-chloro-2-methyl-4-isothiazolin-3-one. The aqueous fabric softener can likewise comprise an oxidation inhibitor as preservative. Examples of suitable standard commercial oxidation inhibitors are ascorbic acid, 2,6-di-tert-butyl-4-methylphenol (BHT), butylhydroxyanisole (BHA), tocopherol and propyl gallate. In particular, the compositions according to the invention can comprise from 0.0001 to 0.5% by weight, preferably 0.001 to 0.2% by weight, of one or more different preservatives. In particular, the compositions according to the invention can comprise from 0.001 to 0.1% by weight, preferably 0.001 to 0.01% by weight, of one or more different oxidation inhibitors.

As organic solvents, the fabric softener can comprise, e.g., short-chain alcohols, glycols and glycol monoethers, with ethanol, 2-propanol, 1,2-propanediol and dipropylene glycol being preferred. In particular, the compositions according to the invention can comprise from 0.1 to 10% by weight, preferably from 0.2 to 5% by weight, of one or more different organic solvents.

The fabric softener can comprise one or more non-siloxane-containing polymers. Examples thereof are carboxymethylcellulose, polyethylene glycol, polyvinyl alcohol, poly(meth)acrylates, polyethyleneimines or polysaccharides. In particular, the compositions according to the invention can comprise from 0.01 to 25% by weight, preferably from 0.1 to 10% by weight, of one or more different non-siloxane-containing polymers.

Moreover, the fabric softener can optionally comprise one or more emulsifiers. The emulsifiers here may be cationic or uncharged in nature. Examples of uncharged emulsifiers are fatty alcohol ethoxylates.

The fabric softener can comprise a complexing agent. Examples of complexing agents that can be used include, besides aminocarboxylic acid compounds, organic aminophosphonic acid derivatives and mixtures thereof. Examples of suitable aminocarboxylic acid compounds are ethylenediaminetetraacetic acid (EDTA), N-hydroxyethylenediaminetriacetic acid, nitrilotriacetic acid (NTA), diethylenetriaminepentaacetic acid (DEPTA). Examples of suitable aminophosphonic acid derivatives are ethylenediamine tetrakis(methylenephosphonic acid), 1-hydroxyethane-1,1-diphosphonic acid (HEDP) and aminotri(methylenephosphonic acid) commercially available from Monsanto under the trade name Dequest 2000. In particular, the compositions according to the invention can comprise from 0.001 to 0.5% by weight, preferably from 0.005-0.25% by weight, of one or more complexing agents.

The textile-softening formulation can also comprise further additives not listed here which are obvious to the person skilled in the art and/or are prior art.

The invention further provides the use of the polysiloxanes comprising nitrogen-containing groups produced according to the invention and/or of the compositions according to the invention in or as detergents or cleaners. Incorporation into a detergent or cleaner provides the consumer with a textile-care detergent or cleaner ("2in1" detergent or cleaner) and thus the consumer does not need to dose two compositions (detergent or cleaner and fabric softener), and also no separate rinse cycle is needed. In addition to the textile-care composition and the surfactants, the detergents or cleaners can comprise further ingredients which further improve the application and/or aesthetic properties of the detergent or cleaner. Preferred detergents or cleaners additionally comprise one or more substances from the group of the surfactants, builder substances, bleaches, bleach activators, enzymes, perfumes, perfume carriers, fluorescence agents, dyes, foam inhibitors, silicone oils, antiredeposition agents, optical brighteners, greying inhibitors, shrink preventers, anticrease agents, color transfer inhibitors, antimicrobial active ingredients, germicides, fungicides, antioxidants, preservatives, corrosion inhibitors, antistats, bittering agents, ironing aids, phobicization and impregnation agents, swelling and non-slip agents, neutral filling salts and also UV absorbers. In particular, the compositions according to the invention detergents or cleaners can comprise between 0.001 and 90% by weight, preferably 0.01 to 45% by weight, of one or more of the further ingredients specified here.

Examples of surfactants which can be used are described in WO 2007/115872, page 17, line 28 to page 21, line 24. The explicit disclosure therein in this respect forms part of this disclosure by virtue of this reference.

Examples of builder substances, builders, bleaches, bleach activators, bleach catalysts and enzymes are described in WO 2007/115872, page 22, line 7 to page 25, line 26, the explicit disclosure of which in this respect forms part of this disclosure by virtue of this reference. Antiredeposition agents, optical brighteners, greying inhibitors, color transfer inhibitors are described by way of example in WO 2007/115872 on page 26, line 15 to page 28, line 2, the explicit disclosure of which in this regard forms part of this disclosure by virtue of this reference. Examples of anticrease agents, antimicrobial active ingredients, germicides, fungicides, antioxidants, preservatives, antistats, ironing aids, UV absorbers are described by way of example in WO 2007/115872 on page 28, line 14 to page 30, line 22, the explicit disclosure of which in this respect forms part of this disclosure by virtue of this reference.

The subject matter of the present invention is illustrated in more detail below by reference to examples without intending to limit the subject matter of the invention to these exemplary embodiments.

EXAMPLES

Measurement Methods

The recording and interpretation of NMR spectra is known to the person skilled in the art. As reference, the book "NMR Spectra of Polymers and Polymer Additives" by A. Brandolini and D. Hills, published 2000 by Verlag Marcel Dekker

Example S1

According to the Invention

Preparation of a Laterally Modified Aminopropylsiloxane Using Ethylphosphonic Acid In a four-neck round-bottomed flask equipped with stirrer, internal thermometer and distillation bridge, 238.1 g (65 mmol) of a dihydroxy-functional polydimethylsiloxane of average chain length 49.2 and 0.43 g of ethylphosphonic acid (98% strength, ABCR GmbH) were heated with stirring. At 87° C., 1.47 g (9.1 mmol) of hexamethyldisilazane (Dynasylan® HMDS, Evonik Industries AG) were added. After further heating to 100° C., the mixture was stirred for 30 minutes at this temperature. Then, 12.45 g (65 mmol) of aminopropylmethyldiethoxysilane (Dynasylan® 1505, Evonik Industries AG) were added and the mixture was distilled for 4 hours at 10-20 mbar. The residue obtained was a colorless, clear, liquid product with a viscosity of 2100 mPa*s at 25° C. The average chain length determined by means of $^{29}$Si-NMR was 268.

Example S2

According to the Invention

Preparation of a Laterally Modified N-(aminoethyl)aminopropylsiloxane Using Octylphosphonic Acid In a four-neck round-bottomed flask equipped with stirrer, internal thermometer and distillation bridge, 238.3 g (65 mol) of a dihydroxy-functional polydimethylsiloxane of average chain length 49.2 and 0.76 g of octylphosphonic acid (Hostaphat OPS 100, Clariant Produkte GmbH) were heated with stiffing. At 80° C., 1.68 g (10.4 mmol) of hexamethyldisilazane (Dynasylan® HMDS, Evonik Industries AG) were added and the mixture was stirred for 30 minutes at 85° C. Then, 10.71 g (52 mmol) of N-(aminoethyl)aminopropylmethyldimethoxysilane (Dynasylan® 1411, Evonik Industries AG) were added and the mixture was stirred for 1 hour at 85° C. Next, a further 0.25 g of octylphosphonic acid were added, and the resulting methanol was distilled off for 3 hours at 100° C. and 20 mbar. The residue obtained was a colorless, clear, liquid product with a viscosity of 14 900 mPa*s at 25° C. The average chain length determined by means of $^{29}$Si-NMR was 299. After storage for one month at room temperature, the viscosity drops to 8200 mPa*s at 25° C.

Example S3

According to the Invention

Preparation of a Laterally Modified Aminopropylsiloxane Using Ethylphosphonic Acid In a four-neck round-bottomed flask equipped with stirrer, internal thermometer and distillation bridge, 238.1 g (65 mmol) of a dihydroxy-functional polydimethylsiloxane of average chain length 49.2 and 0.43 g of ethylphosphonic acid (98% strength, ABCR GmbH) were heated with stirring. At 73° C., 1.46 g (9.1 mmol) of hexamethyldisilazane (Dynasylan® HMDS, Evonik Industries AG) were added. After further heating to 85° C., the mixture was stirred for 30 minutes at this temperature. Then, 9.94 g (52 mmol) of aminopropylmethyldiethoxysilane (Dynasylan® 1505, Evonik Industries AG) were added and the mixture was distilled for 4 hours at 85° C. and 14-20 mbar. The residue obtained was a colourless, clear, liquid product with a viscosity of 2700 mPa*s at 25° C. The average chain length determined by means of $^{29}$Si-NMR was 305.

Example S4

Not According to the Invention

Preparation of a Laterally Modified N-(aminoethyl)aminopropylsiloxane Using Carboxylic Acids In a four-neck round-bottomed flask equipped with stirrer, internal thermometer and distillation bridge, 383.7 g (100 mmol) of a dihydroxy-functional polydimethylsiloxane of average chain length 51.5, 1.68 g (10.4 mmol) hexamethyldisilazane (Dynasylan® HMDS, Evonik Industries AG) and 0.12 g of acetic acid (99% strength, Sigma Aldrich) were heated to 85° C. with stirring and stirred at this temperature for 40 min. 16.5 g (80 mmol) of N-(aminoethyl)aminopropylmethyldimethoxysilane (Dynasylan® 1411, Evonik Industries AG) and 0.63 g of isononanoic acid (97%, Alfa Aesar) were added and the resulting methanol was distilled off for 2 hours at 85° C. and 20 mbar. The residue obtained was a yellowish, slightly cloudy, liquid product with a viscosity of 7800 mPa*s at 25° C. The average chain length determined by means of $^{29}$Si-NMR is 250. After storage for just one week at room temperature, the viscosity had increased to 18 100 mPa*s at 25° C.

Example S5

According to the Invention

Preparation of a Laterally Modified N-(aminoethyl)aminopropylsiloxane Using Ethylphosphonic Acid In a four-neck round-bottomed flask equipped with stirrer, internal thermometer and distillation bridge, 238.32 g (65 mmol) of a dihydroxy-functional polydimethylsiloxane of average chain length 49.2 and 0.43 g of ethylphosphonic acid (98% strength, ABCR GmbH) were heated with stirring. At 80° C., 1.68 g (10.4 mmol) of hexamethyldisilazane (Dynasylan® HMDS, Evonik Industries AG) were added and the mixture was stirred for 30 min at 85° C. Then, 10.72 g (52 mmol) of N-(aminoethyl)aminopropylmethyldimethoxysilane (Dynasylan® 1411, Evonik Industries AG) were added and the mixture was stirred for 1 hour at 85° C. After heating to 100° C., the mixture was distilled for one hour at 10-20 mbar. The residue obtained was a colorless, milky cloudy, liquid product with a viscosity of 1350 mPa*s at 25° C. The average chain length determined by means of $^{29}$Si-NMR was 166.

Example S6

According to the Invention

Preparation of a Siloxane Laterally Modified with N-(aminoethyl)aminopropyl Groups and Guanidinopropyl Groups In a four-neck round-bottomed flask equipped with stirrer, internal thermometer and distillation bridge, 2487.42 g of aminopropylmethyldiethoxysilane (Dynasylan® 1505, Evonik Industries AG) and 1800 g of ethanol were introduced as initial charge and, with stirring at room temperature, 702 g of acetic acid (99-100% strength, J. T. Baker) were added dropwise over the course of 30 min. The temperature increased to 63° C. After heating to 80° C., a solution of 273.13 g of cyanamid F 1000 (Alzchem Trostberg GmbH) in 800 g of ethanol was added dropwise, with stirring, over a period of 2 h 45 min. The mixture was stirred for a further 9 hours at 80° C. A small sample was taken and distilled off at 60° C. for 1 h at 10-20 mbar. The residue corresponded to 54.7% by weight and represents the solids content of the ethanolic guanidinopropylmethyldiethoxysilane solution determined in this way.

In a four-neck round-bottomed flask equipped with stirrer, internal thermometer and distillation bridge, 274.98 g (75 mmol) of a dihydroxy-functional polydimethylsiloxane of average chain length 49.2 and 0.87 g of octylphosphonic acid (Hostaphat OPS 100, Clariant Produkte GmbH) were heated with stirring. At 80° C., 1.94 g (12 mmol) of hexamethyldisilazane (Dynasylan® HMDS, Evonik Industries AG) were added and the mixture was stirred for 30 minutes at 85° C. Then, 6.18 g (30 mmol) of N-(aminoethyl)aminopropylmethyldimethoxysilane (Dynasylan® 1411, Evonik Industries AG) and 14.61 g of the 54.7% strength ethanolic guanidinopropylmethyldiethoxysilane solution were added and the mixture was stirred for 1 hour at 85° C. Next, a further 0.29 g of octylphosphonic acid was added, and the resulting methanol and ethanol were distilled off for 3 hours at 100° C. and 20 mbar. The residue obtained was a colorless, cloudy, viscous product which was admixed with 2% by weight of 2-propanol and then has a viscosity of 3340 mPa*s at 25° C. The average chain length determined by means of $^{29}$Si-NMR is 227.

Example S7

According to the Invention

Preparation of a Non-End-Capped Laterally Modified Aminopropylsiloxane Using Ethylphosphonic Acid In a four-neck round-bottomed flask equipped with stirrer, internal thermometer and distillation bridge, 238.3 g (65 mmol) of a dihydroxy-functional polydimethylsiloxane of average chain length 49.2 and 0.43 g of ethylphosphonic acid (98% strength, ABCR GmbH) were heated with stirring. At 85° C., 9.95 g (52 mmol) of aminopropylmethyldiethoxysilane (Dynasylan® 1505, Evonik Industries AG) were added. Then, a vacuum was applied and the mixture was distilled for 3 hours at 100° C. and 20 mbar. The residue obtained was a colorless, slightly cloudy, liquid product with a viscosity of 6700 mPa*s at 25° C. The average chain length determined by means of $^{29}$Si-NMR was 342.

Example S8

According to the Invention

Preparation of a Laterally Modified Aminopropylsiloxane End-Capped with 1-octadecanol Using Ethylphosphonic Acid In a four-neck round-bottomed flask equipped with stirrer, internal thermometer and distillation bridge, 238.1 g (65 mmol) of a dihydroxy-functional polydimethylsiloxane of average chain length 49.2 and 0.43 g of ethylphosphonic acid (98% strength, ABCR GmbH) were heated with stirring. At 80° C., 9.94 g (52 mmol) of aminopropylmethyldiethoxysilane (Dynasylan® 1505, Evonik Industries AG) were added. Then, a vacuum was applied and the mixture was distilled for 1 hour at 85° C. and 18 mbar. Next, 7.02 g (26 mmol) of 1-octadecanol (Tego® alkanol 18, Evonik Industries AG) were added and the mixture was distilled for 3 hours at 100° C. and 16 mbar. The residue obtained was a colorless, cloudy product of high viscosity at room temperature. The average chain length determined by means of $^{29}$Si-NMR was 244.

Example S9

According to the Invention

Preparation of a Branched Laterally Modified Aminopropylsiloxane Using Octylphosphonic Acid In a four-neck round-bottomed flask equipped with stirrer, internal thermometer and distillation bridge, 183.3 g (50 mmol) of a dihydroxy-functional polydimethylsiloxane of average chain length 49.2 and 0.58 g of octylphosphonic acid (Hostaphat OPS 100, Clariant Produkte GmbH) were heated with stiffing. At 80° C., 3.23 g (20 mmol) of hexamethyldisilazane (Dynasylan® HMDS, Evonik Industries AG) were added and the mixture was stirred for 30 min at 85° C. Then, 4.43 g (20 mmol) of aminopropyltriethoxysilane (99% strength, Sigma Aldrich) and a further 0.19 g of octylphosphonic acid were added and the mixture was distilled for 4 hours at 100° C. and 10-20 mbar. The residue obtained was a colorless, clear, liquid product with a viscosity of 2320 mPa*s at 25° C. The average chain length determined by means of $^{29}$Si-NMR was 133.

Example 10

Heat Storage Test at Room Temperature and at 50° C.

100 g glass bottles were each approximately half-filled with the products of examples S1 to S5 and stored at room temperature or placed in a drying cabinet heated at 50° C. At the time intervals given in Tables 1a and 1b, the appearance was examined and optionally the viscosity was measured at 25° C. if the optical appearance indicated an altered viscosity. The results are shown in Tables 1a and 1b.

TABLE 1a

Results of the heat storage test

| Storage time/50° C. | Example S3 | Example S4 | Example S5 |
|---|---|---|---|
| 0 weeks | colorless, clear 2700 mPa*s | yellowish, cloudy 7800 mPa*s | colorless, slightly cloudy 1350 mPa*s |
| 4 weeks | colorless, clear | yellow, cloudy high-viscosity | colorless, slightly cloudy 3200 mPa*s |
| 8 weeks | colorless, clear | — | colorless, slightly cloudy 4500 mPa*s |
| 12 weeks | colorless, clear 2960 mPa*s | — | — |

TABLE 1b

Result of the room temperature storage

| Storage time at room temperature | Example S1 | Example S2 | Example S4 |
|---|---|---|---|
| 0 weeks | colorless, clear 2100 mPa*s | colorless, clear 14900 mPa*s | yellowish, cloudy 7800 mPa*s |
| 1 week | colorless, clear | — | yellow, cloudy 18 100 mPa*s |
| 4 weeks | colorless, clear | colorless, clear 8200 mPa*s | yellow, cloudy high-viscosity |
| 12 weeks | colourless, clear 2550 mPa*s | — | — |

A comparison of examples S1, S2, S3 and S5 with example S4 shows clearly that the amino-functional siloxanes produced by the process according to the invention exhibit no yellowing following production or upon storage.

The comparison of example S5 with example S4 shows that the viscosity of the amino-functional siloxanes produced by the process according to the invention increases to a lesser extent. In the preferred case, as shown in example S2, no viscosity increase at all takes place.

Example 11

Textile Care Application Examples

To determine the softening effect of the polysiloxanes comprising nitrogen-containing groups on textile fabrics, cotton towels were treated therewith.

For this purpose, compositions having the polysiloxanes according to the invention comprising nitrogen-containing groups and compounds D), which were obtained as products in examples S1 to S3 and examples S5 and S6, were used to produce macroemulsions according to the following instructions:

20 parts of a polysiloxane comprising nitrogen-containing groups according to the invention and heated to 40° C. were introduced as initial charge in a beaker with propeller stirrer with stirring. Then, in succession, 10 parts by weight of dipropylene glycol, 10 parts by weight of TEGO® alkanol L6 (lauryl alcohol polyethoxylate (n=6) from Evonik Goldschmidt GmbH) were added with stiffing. Finally, the mixture was topped up to 100 parts by weight with water and after-stirred until the mixture had cooled to room temperature, but for at least 15 min. The emulsions are cloudy at room temperature.

TABLE 2

Prepared polysiloxane formulations (macroemulsions)

| Formulation example | Used reaction product from |
|---|---|
| M1 | Example S1 |
| M2 | Example S2 |
| M3 | Example S3 |
| M5 | Example S5 |
| M6 | Example S6 |

The composition according to the invention obtained as product in example S1 was used to produce a microemulsion (ME1) having a composition as given in Table 3.

TABLE 3

Composition of the polysiloxane formulations (microemulsion (ME1))

| Constituent | % by wt. ME1 |
|---|---|
| Reaction product from example S1 | 49.5 |
| TEGO ® alkanol TD6, Evonik Goldschmidt GmbH (POE-(6)-isotridecyl alcohol) | 6.6 |
| TEGO ® alkanol TD12, Evonik Goldschmidt GmbH (POE-(12)-isotridecyl) | 24.2 |
| TEGOSOFT ® P, Evonik Goldschmidt GmbH (isopropyl palmitate) | 9.9 |
| Water | 9.8 |

TEGO® alkanol TD6, TEGO® alkanol TD12 and TEGOSOFT® P were introduced as initial charge at room temperature in a beaker with propeller stirrer with stirring. The reaction product from example S1 was then added with stiffing. Finally, with the slow addition of water, the mixture was topped up to 100 parts by weight and after-stirred until clear.

Example 12

Preparation of a Fabric Softener Comprising the Polysiloxane According to the Invention from Example S1

33.3 g of a liquid REWOQUAT® WE 18 (trade name of Evonik Goldschmidt GmbH, triethanolamine-based ester quat with an active content of 90%), heated to 60° C., were added, with stiffing, to 556 g of tap water heated to 55° C., stirred for 20 min using a propeller stirrer at 50° C., then 6 g of the microemulsion from formulation example ME1 were added and the mixture was cooled to room temperature over the course of about one hour.

Pretreatment of the Cotton Fabric:

Cotton terry fabric measuring 80 cm×50 cm with an areal weight of ca. 350 g/m² was washed twice with standard washing powder, rinsed twice, spun and hung on a line in one layer to dry in the air.

Treatment of the Cotton Fabric:

The polysiloxane formulations M1, M2, M3, M5, M6 and ME 1 described above were each diluted with cold tap water to give a rinsing solution which comprised 0.025% by weight of polysiloxane produced according to the invention.

The cotton towels were immersed for 10 min in two liters of the rinsing solution. It is to be ensured here that the towels were wetted evenly by the rinsing solution. The towels were then spun and hung on a line in one layer to dry. The treated cotton terry towels were cut into 10 equal pieces measuring 16 cm by 25 cm.

To assess the soft feel, an experienced team of 9 test persons was assembled which assessed the anonymized feel samples of the cotton fabric treated with the emulsions with the help of a hand panel test. For this, each test person was given their own cotton towel. Assessment was made here on a scale from 0 (hard and unpleasant in feel) to 5 (soft and pleasant in feel) with the possibility of whole-numbered intermediate values.

To assess the soft feel, the individual evaluations were summed, meaning that for 9 test persons a maximum soft feel of 45 can arise.

In addition, among the feel samples, an untreated sample (blank value), without evident marking, was always added.

The results of the assessment of the soft feel are given in Table 4.

TABLE 4

Summary of the soft-feel results

| Cotton fabric treated with polysiloxane formulation | Soft feel |
|---|---|
| M1 | 37 |
| M2 | 37 |
| M3 | 35 |
| M5 | 35 |
| M6 | 36 |
| ME1 | 34 |
| without polysiloxane ("blank value") | 0 |

It is clearly evident from the data in Table 4 that the polysiloxanes comprising nitrogen-containing groups according to the invention are suitable for achieving a greatly improved soft feel compared with an untreated cotton towel.

While the present invention has been particularly shown and described with reference to the preferred embodiments, it will be readily appreciated by those of ordinary skill in the art that various changes and modifications may be made without departing from the spirit and scope of the invention. It is intended that the present invention be understood to cover the disclosed embodiments, those alternatives which have been discussed and all equivalents thereto.

What is claimed is:

1. A process for producing amino-functional polysiloxanes, said process comprising: reacting
   identical or different terminally hydroxy-functional, linear or branched polysiloxanes,
   identical or different alkoxysilanes of formula (I)

$$R^1_x R^2_{3-x} SiR^3 \qquad (I)$$

where
   $R^1$ is identical or different alkyl radicals having 1 to 4 carbon atoms,
   $R^2$ is identical or different, alkoxy radicals having 1 to 4 carbon atoms,
   $R^3$ is an organic radical having at least one nitrogen atom,
   x=0 to 2,
   water, and
   disilazane,
      in the presence of at least one phosphorus-containing, Brønsted-acidic compound.

2. The process according to claim 1, wherein the at least one phosphorus-containing, Brønsted-acidic compound is a compound of formula (II)

$$H_a R^{11}_b P_c O_d \qquad (II)$$

where
   $R^{11}$=identical or different, mono- or polyvalent hydrocarbon radicals optionally having oxygen and/or nitrogen atom(s),
   a=(c+2) or <(c+2)
   b=(c+2) or <(c+2)
   c=1 to 10, d=(3c+1) or <(3c+1)
   with the proviso that a+b=c+2 and a>0.

3. The process according to claim 1, wherein the at least one phosphorus-containing, Brønsted-acidic compound is present in an amount from 0.1 to 30 mol %, based on the amount of said alkoxysilanes of formula (I).

4. The process according to claim 1, wherein the fraction of water based on the total amount of said polysiloxanes, said alkoxysilanes of formula (I), said water, said disilazane, and said at least one phosphorus-containing, Brønsted-acidic compound is from 0.001 to 1% by weight.

5. The process according to claim 1, wherein said polysiloxanes and said alkoxysilanes of formula (I) are used in amounts such that a molar ratio of OH groups in said polysiloxanes to radicals $R^2$ in said alkoxysilanes of formula (I) is 1:1 or >1:1.

6. The process according to claim 1, wherein the at least one phosphorus-containing, Brønsted-acidic compound comprises monomeric or oligomeric phosphoric acids, monomeric or oligomeric phosphonic or phosphinic acids, hypodiphosphonic or hypodiphosphinic acids, or hydrocarbon-radical-substituted organic derivatives of one of the aforementioned acids.

7. The process according to claim 6, wherein the at least one phosphorus-containing, Brønsted-acidic compound comprises octylphosphonic acid.

8. A composition comprises a polysiloxane containing nitrogen-containing groups, disilazane, and at least one phosphorus-containing, Brønsted-acidic compound.

9. The composition according to claim 8, wherein said polysiloxane containing nitrogen-containing groups is present in an amount from 90.00% by weight to 99.99% by weight and the at least one phosphorus-containing, Brønsted-acidic compound is present in an amount from 10.00% by weight to 0.01% by weight.

10. The composition of claim 8, wherein said composition is a component of a textile-care composition, a detergent or a cleaner for textiles or a hydrophobicizing composition.

11. The composition according to claim 8, wherein the at least one phosphorus-containing, Brønsted-acidic compound is a compound of empirical formula (II)

$$H_a R^{11}_b P_c O_d \qquad (II)$$

where
   $R^{11}$=identical or different, mono- or polyvalent hydrocarbon radicals optionally having oxygen and/or nitrogen atom(s),
   a=(c+2) or <(c+2)
   b=(c+2) or <(c+2)
   c=1 to 10, d=(3c+1) or <(3c+1)
   with the proviso that a+b=c+2 and a>0.

12. The composition according to claim 8, wherein said polysiloxane containing nitrogen-containing groups is present in an amount from 95.00% by weight to 99.90% by weight and said at least one phosphorus-containing, Brønsted-acidic compound is present in an amount from 5.00% by weight to 0.10% by weight.

13. The composition according to claim 8, wherein said polysiloxane containing nitrogen-containing groups is present in an amount from 97.00% by weight to 99.70% by weight and said at least one phosphorus-containing, Brønsted-acidic compound is present in an amount from 3.00% by weight to 0.30% by weight.

14. The composition according to claim 8, wherein said composition is a clear and colorless liquid.

* * * * *